(12) United States Patent
Schacht et al.

(10) Patent No.: US 12,372,121 B1
(45) Date of Patent: Jul. 29, 2025

(54) FRICTION ASSISTED DOG CLUTCH

(71) Applicant: Dana Belgium N.V., Flanders (BE)

(72) Inventors: Filip D. Schacht, Meulebeke (BE); Kurt Cattoor, Koolkerke (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/428,287

(22) Filed: Jan. 31, 2024

(51) Int. Cl.
  *F16D 25/061* (2006.01)
  *F16D 23/06* (2006.01)
  *F16D 25/0635* (2006.01)
  *F16D 48/06* (2006.01)

(52) U.S. Cl.
  CPC ........... *F16D 25/061* (2013.01); *F16D 23/06* (2013.01); *F16D 25/0635* (2013.01); *F16D 48/066* (2013.01); *F16D 2023/0643* (2013.01); *F16D 2023/0693* (2013.01); *F16D 2500/1026* (2013.01); *F16D 2500/10412* (2013.01)

(58) Field of Classification Search
  CPC .... F16D 25/061; F16D 25/0635; F16D 25/10; F16D 23/04; F16D 23/06; F16D 23/0606; F16D 2023/0643; F16D 2023/0693; F16D 21/08; F16D 11/14; F16D 48/066; F16D 2011/008; F16D 2500/1026; F16D 2500/10412

USPC ................. 192/53.51, 85.18, 69.62
See application file for complete search history.

(56) References Cited

U.S. PATENT DOCUMENTS

| | | | | |
|---|---|---|---|---|
| 305,372 | A * | 9/1884 | Burdict | F16D 23/04 144/182 |
| 4,555,003 | A * | 11/1985 | Phillips | F16D 11/10 192/48.5 |
| 10,597,068 | B2 | 3/2020 | Steinkogler et al. | |
| 2011/0155530 | A1 | 6/2011 | Vierk et al. | |
| 2012/0152685 | A1* | 6/2012 | Phillips | F16D 25/0635 192/48.5 |

FOREIGN PATENT DOCUMENTS

| | | |
|---|---|---|
| CN | 113357281 A | 9/2020 |
| EP | 3424797 B1 | 4/2020 |

* cited by examiner

*Primary Examiner* — Richard M Lorence
(74) *Attorney, Agent, or Firm* — McCoy Russell LLP

(57) ABSTRACT

Systems and methods are provided for a friction assisted dog clutch assembly, comprising: a piston; one or more pins, wherein the pins are adapted to be moved by the piston; one or more friction discs, wherein the friction discs have a number of slots and the plurality of pins pass through the slots; and an endplate, wherein the endplate has a number of recesses adapted to receive the pins.

16 Claims, 8 Drawing Sheets

| Position | Pressure | Piston return springs | Pin return springs |
|---|---|---|---|
| Disengaged | Less than first threshold | Extended | Extended |
| Synchronizing | Greater than first threshold and less than second threshold | Compressed | Extended |
| Enagaged | Greater than first threshold and second threshold | Compressed | Compressed |

FIG. 5

FRICTION ASSISTED DOG CLUTCH

TECHNICAL FIELD

The present description relates generally to systems and methods for friction assisted dog clutches.

BACKGROUND AND SUMMARY

A powertrain of a vehicle may include a transmission which may utilize engagement and disengagement of clutches to shift between drive gears or gearsets. Such clutches may be wet clutches which synchronize rotational movement of parts of the transmission. For example, a wet clutch may include a hydraulically pressurized piston which may be pressed against friction discs under pressure to synchronize rotation of the parts.

However, there are some drawbacks to friction-based wet clutches. A capacity of torque transfer is limited in such a friction clutch by a number of friction discs included in the clutch. To achieve high torque transfer, a relatively large number of friction discs are demanded. However, more friction discs call for more space, leading to a larger packaging volume of the friction clutch. Consequently, in some configurations, a friction clutch carrying enough discs for a high torque load may be too large to fit in the configuration. Additionally, the greater the number of friction discs, the less efficient the clutch may be.

Dog clutches with interlocking elements such as teeth, dogs, and the like, may be used to transfer greater torque than friction clutches due to more reasonable packing size and efficiency (e.g., where efficiency is the power loss relative to torque input during torque transfer). However, dog clutches also have some associated drawbacks. For example, dog clutches may cause torque shock to a system, especially when the rotating components are not synchronized prior to engagement. Matching rotation of the components before engagement of a dog clutch to reduce shock and promote a smoother engagement may demand additional equipment, such as a synchronizer.

The issues described above may be at least partially addressed by a friction assisted dog clutch (FADC), comprising: a piston; a plurality of pins, wherein the plurality of pins are adapted to be moved by the piston; one or more friction discs, wherein the friction discs have a number of slots and the plurality of pins pass through the slots; and an endplate, wherein the endplate has a number of recesses adapted to receive the plurality of pins. In this way, friction and dog clutch mechanisms are combined such that the FADC may synchronize inertias and transfer high torque with increased efficiency compared to friction clutches. Thus, an FADC may combine advantages of both a friction clutch and dog clutch into a single assembly. Additionally, the FADC may be more compact in some cases, compared to a size of a friction clutch with enough friction discs to achieve a similar torque transfer capability, and/or compared to a dog clutch and synchronizer combination with similar capabilities.

An FADC may be used in transmissions as described above to increase torque transfer efficiency. As such, FADCs may be used in transmissions of a variety of vehicles, including those with an internal combustion engine and/or an electric motor. Electric and hybrid vehicles may experience extension in a range of a traction battery due to higher efficiency of the FADCs. In another example, an FADC may be advantageous in a power take-off connection or disconnects which demand relatively high torque transfer. FADCs may also be used in other systems wherein synchronization of two rotating elements is desired on occasion, and high torque transfer between the rotating elements is demanded.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 5 shows a table of positions of an FADC, such as the FADC of FIG. 2.

DETAILED DESCRIPTION

Figure 1:
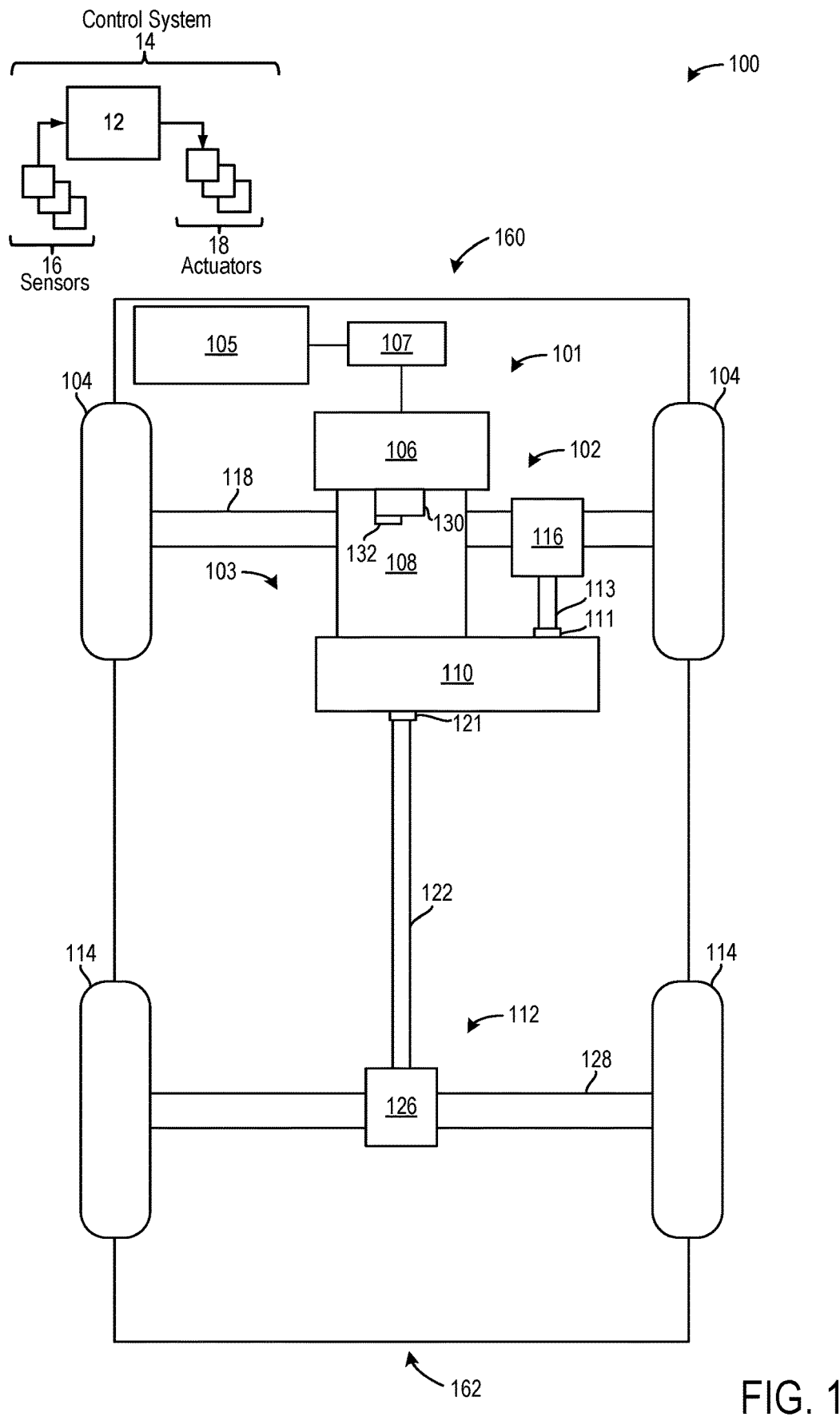
FIG. 1 shows a schematic depiction of an example vehicle powertrain, which may include one or more friction assisted dog clutches.
Figure 2:
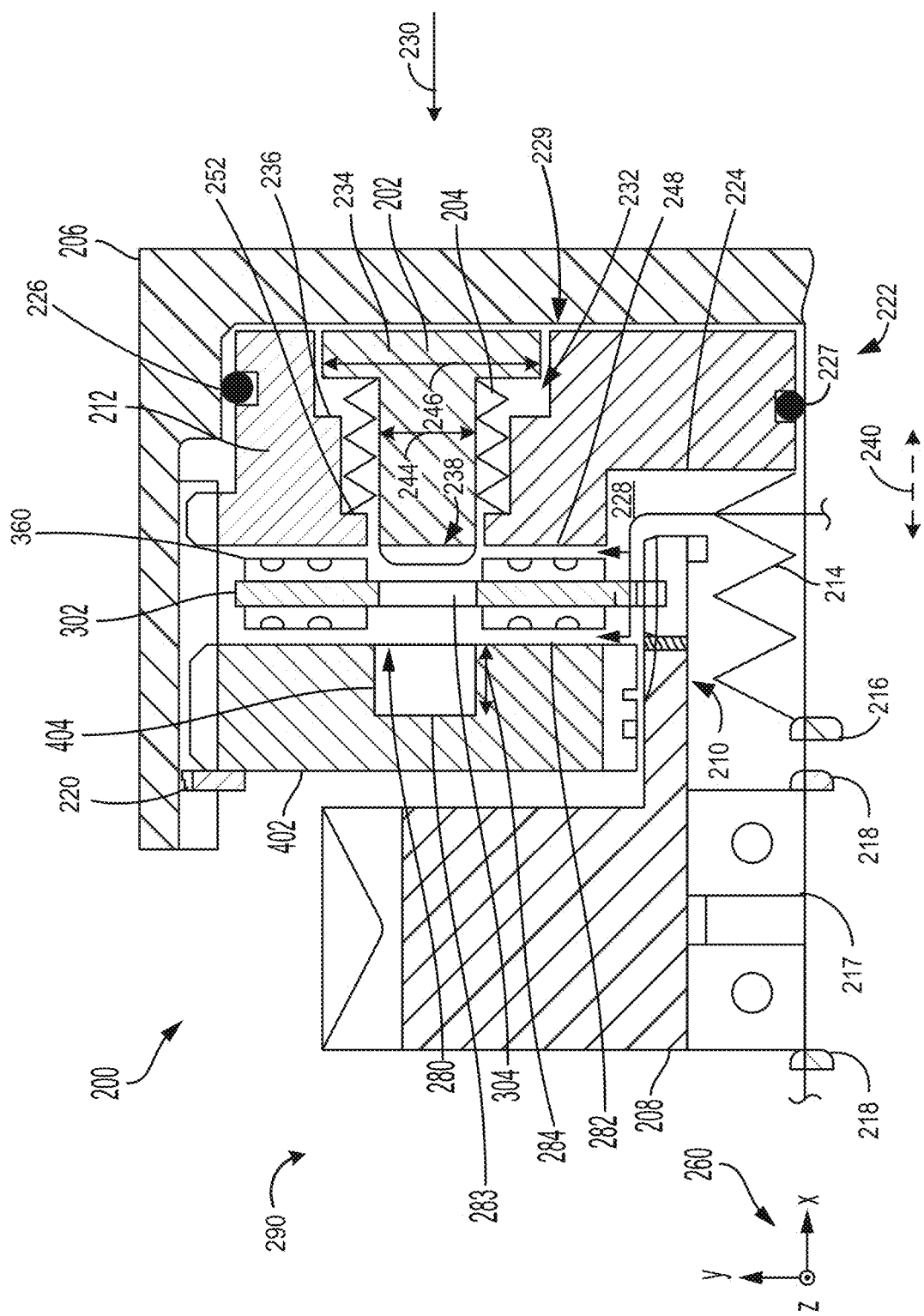
FIG. 2 shows a cross section view of an FADC that may be incorporated in a vehicle such as the vehicle depicted in FIG. 1.
Figure 3A:
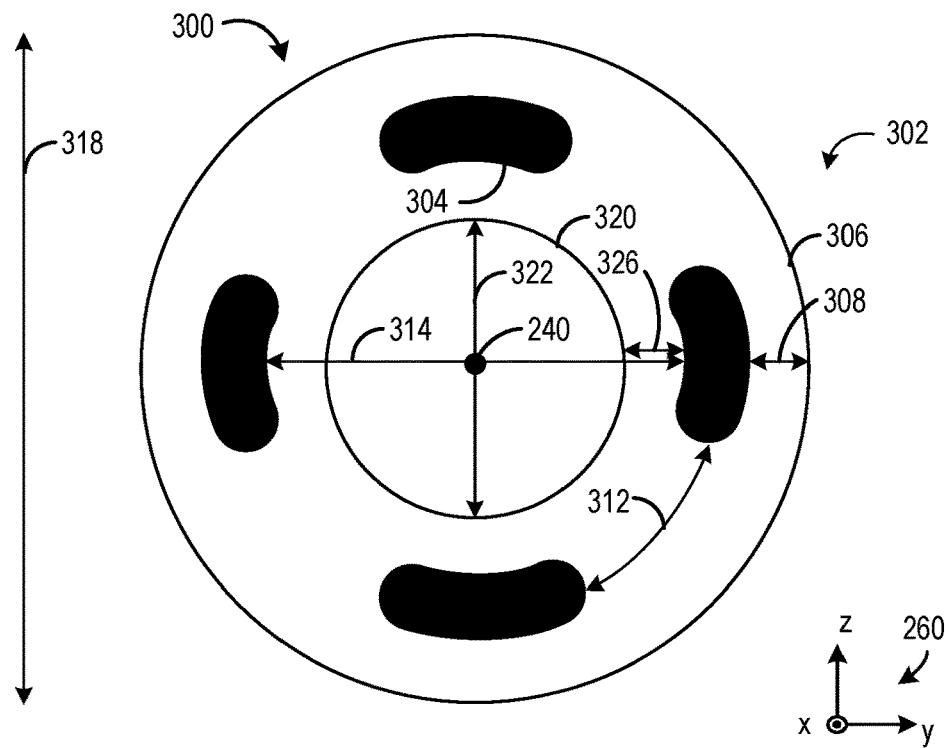
FIG. 3A shows a first view of a friction disc of the FADC depicted in FIG. 2.
Figure 3B:
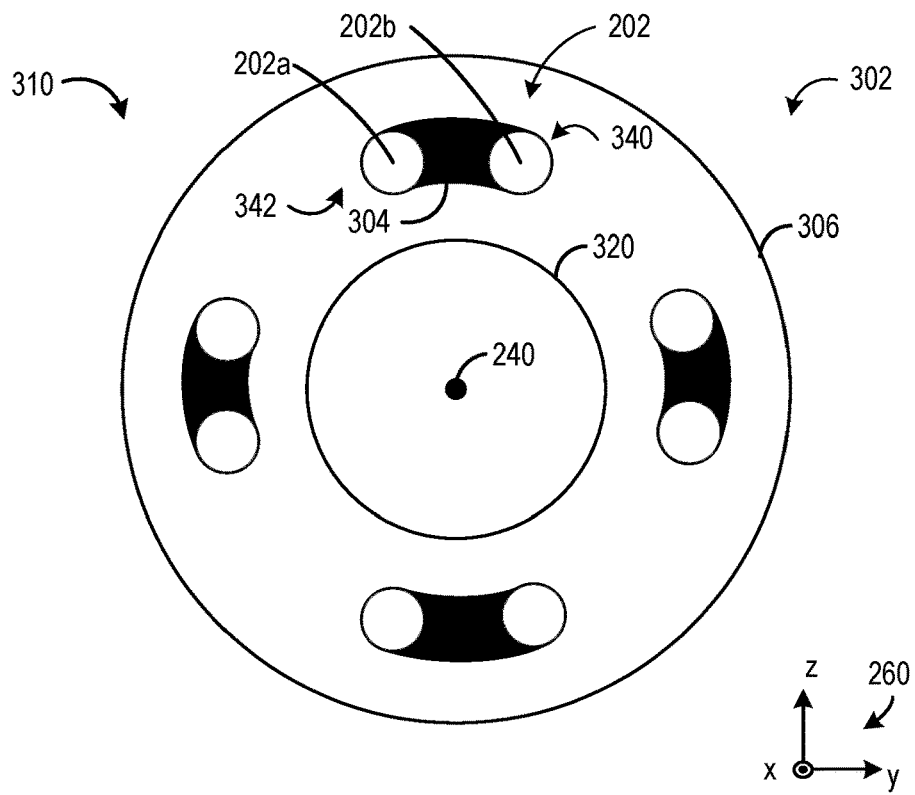
FIG. 3B shows a second view of the friction disc of FIG. 3A.
Figure 4A:
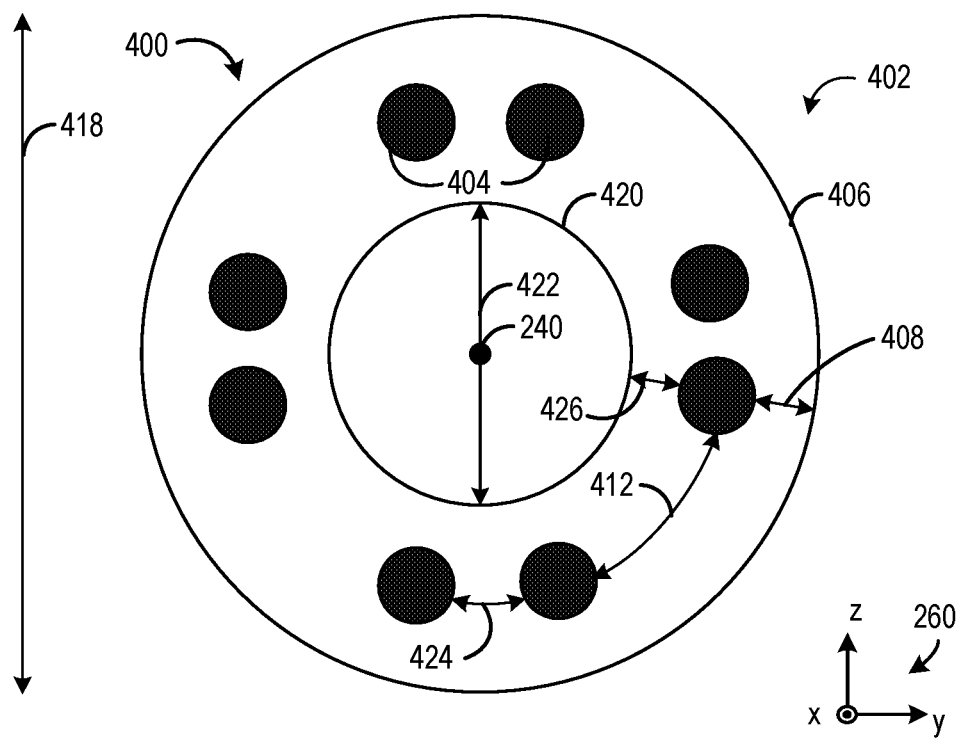
FIG. 4A shows a first view of an endplate of the FADC depicted in FIG. 2.
Figure 4B:
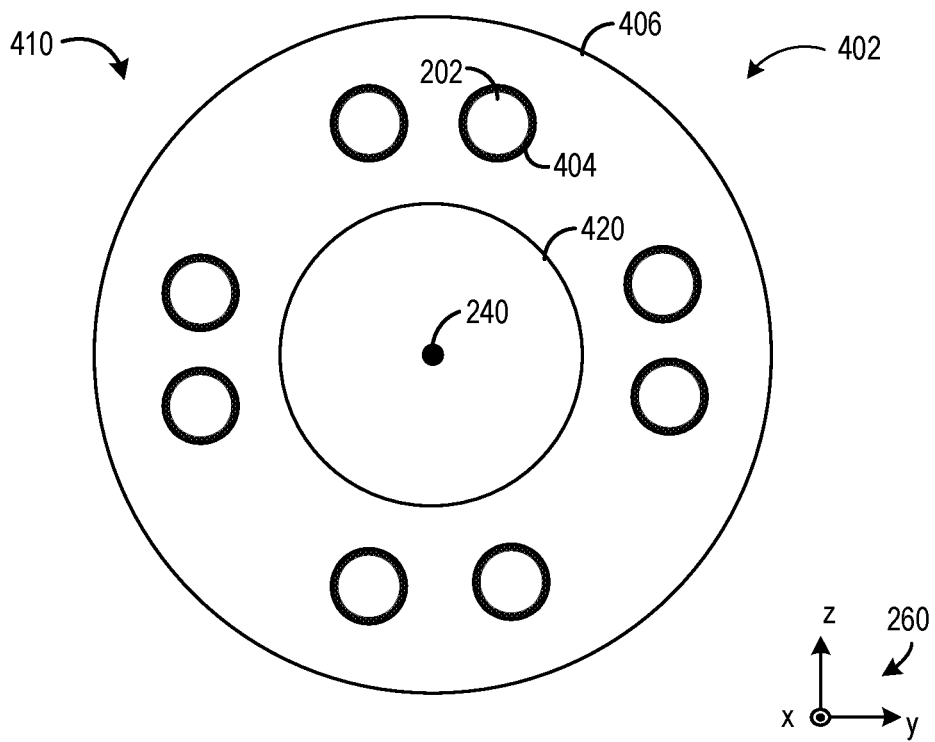
FIG. 4B shows a second view of the endplate of FIG. 4A.
Figure 6:
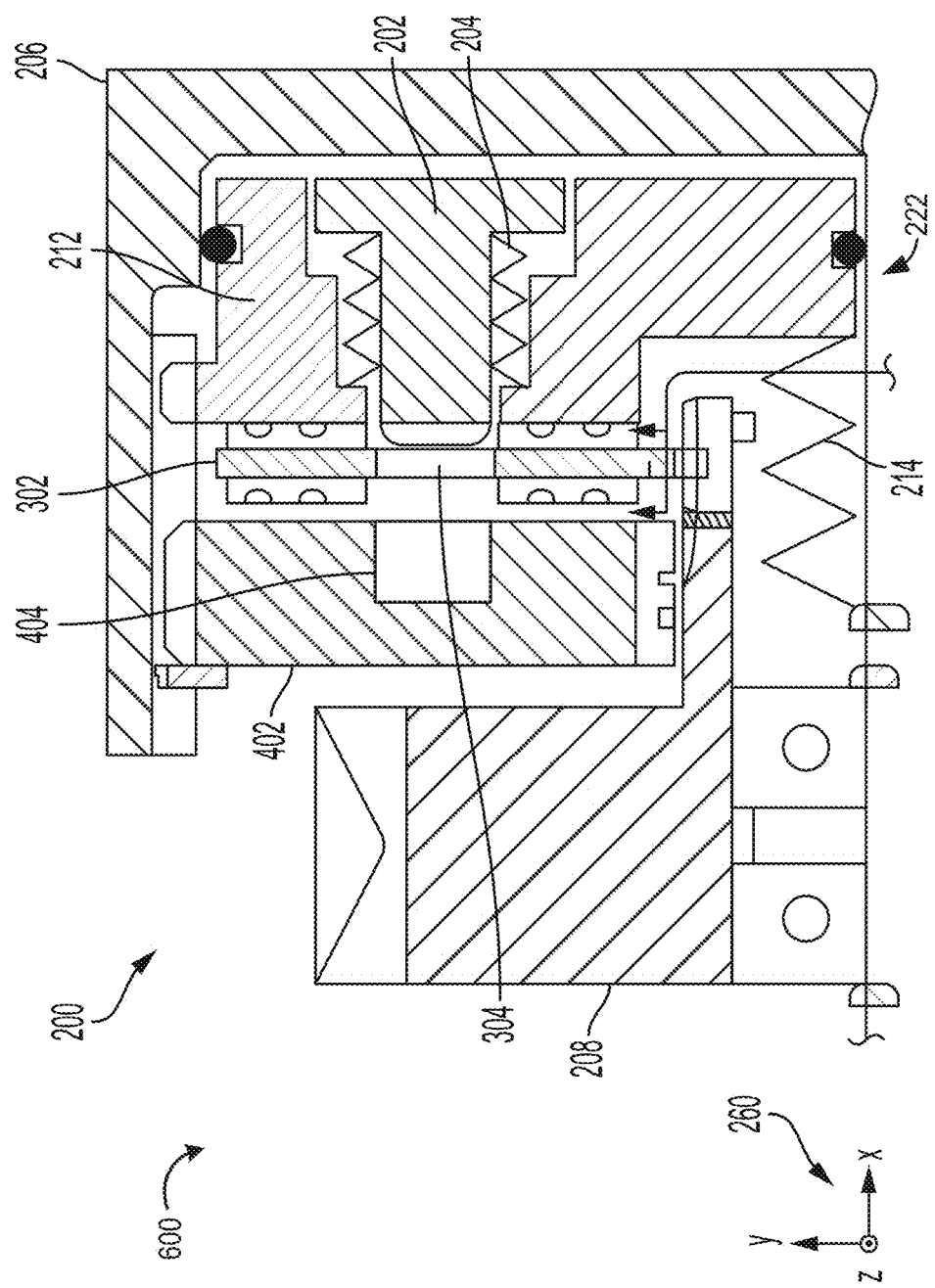
FIG. 6 shows a second cross section view of the FADC of FIG. 2, with the FADC in a synchronizing position.
Figure 7:
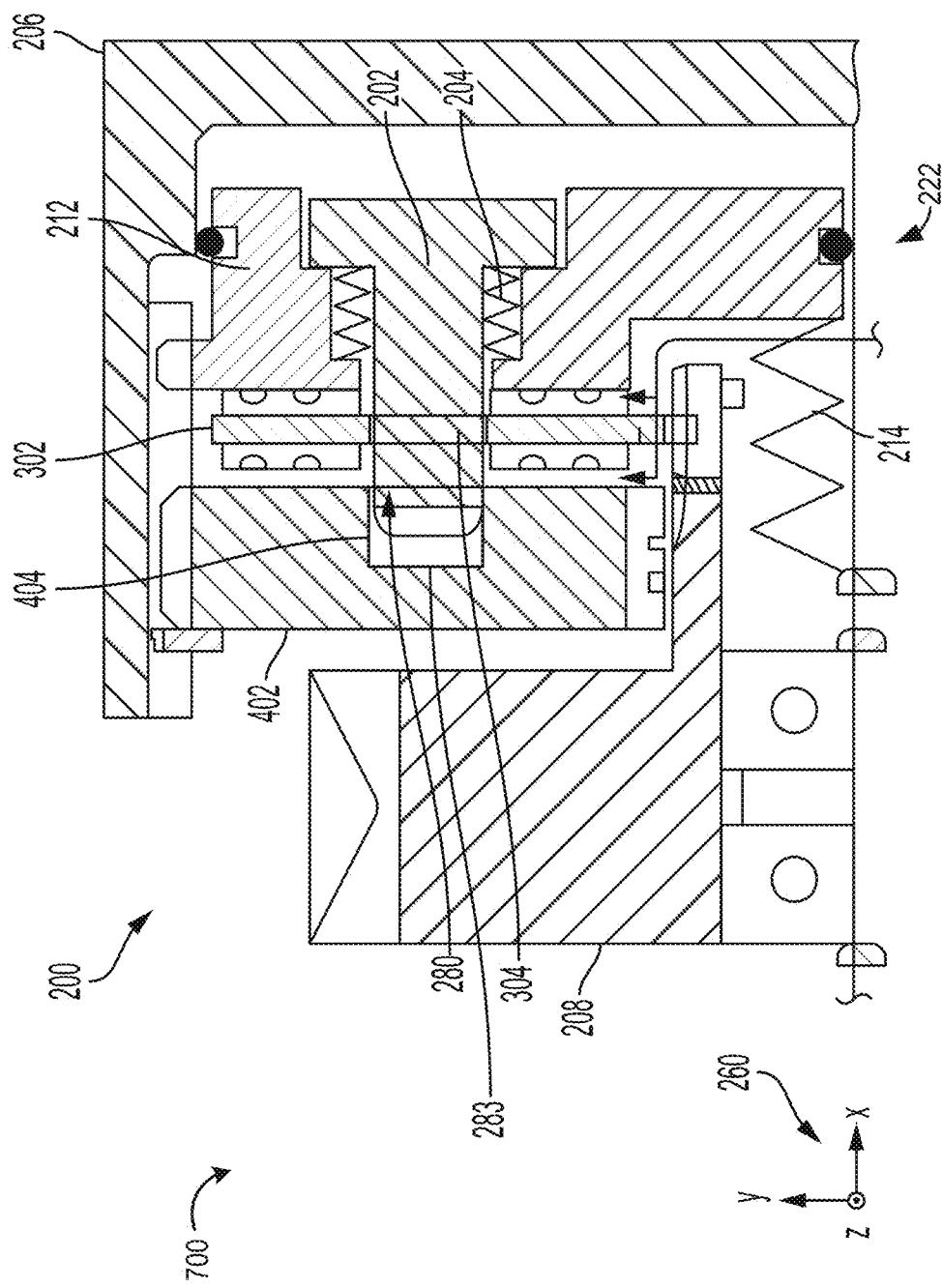
FIG. 7 shows a third cross section view of the FADC of FIG. 2, with the FADC in an engaged position.

The following description relates to systems and methods for an FADC. The FADC may be included in a vehicle powertrain, an example of which is depicted in the schematic representation of FIG. 1, to facilitate engaging and disengaging of gears or gearsets at, for example, in a vehicle transmission. For example, the vehicle transmission may be an automatic transmission where gear shifts are performed by opening/ot closing FADCs and/or other clutches. The opening and closing of the FADCs may be actuated via hydraulic pressure changes at the FADCs which may compel movement of pistons of the FADCs. A cross section of an FADC from FIG. 1 is shown in FIG. 2, including one or more friction discs (also referred to as disks) and an endplate which interact with the piston and pins of the FADC. A friction disc from the FADC in FIG. 2 is shown in FIGS. 3A-3B, and the endplate is shown in FIGS. 4A-4B. The FADC may be in one of several positions, including engaged, synchronizing, and disengaged as shown in a table in FIG. 5. Cross section views of the FADC in a synchronizing position and an engaged position are shown in FIGS. 6 and 7, respectively. Reference axes 260 are shown in FIGS. 2-4 and 6-7, including an x-axis, y-axis, and z-axis, where the x-axis may be parallel to an axis of rotation of elements of the FADC, and y-axis and z-axis may be parallel to radial directions. A flowchart of a method for engaging and/or disengaging (e.g., transitioning between disengaged, synchronizing, and engaged positions) and/or maintaining a position of the FADC is provided in FIG. 8.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

Turning first to FIG. 1, a vehicle 100 is depicted having a powertrain 101 and a drivetrain 103. The powertrain comprises a prime mover 106 and a transmission 108. The prime mover 106 may be an internal combustion engine and/or an electric motor, for example, and is operated to provide rotary power to the transmission 108. The transmission 108 may be of various types, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

In one example, the transmission 108 may be a dual-clutch automatic transmission where a first clutch of the dual-clutch automatic transmission may be closed to engage a first type of gear or gearset, e.g., an odd gear, while a second clutch of the dual-clutch automatic transmission is open and disengaged, where the first and second clutches may each be an FADC. Conversely, the second clutch may be used to engage a second type of gear or gearset, e.g., an even gear, when closed while the first clutch is open and disengaged. The first and second clutches may be represented as a clutch 130 shown in FIG. 1, where the clutch 130 may rely on translation of a piston according to changes in hydraulic pressure and may be arranged in the transmission 108 to enable shifting between gears. It will be appreciated that the clutch 130 of FIG. 1 is a general depiction of where the clutch 130 is located and not representative of an actual location within the transmission 108. Further, as described above, more than one clutch 130 may be included in the transmission 108. Additional details of the clutch 130 are provided further below. Furthermore, the dual-clutch automatic transmission, as described above, is a non-limiting example of one or more FADCs incorporated into a transmission.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC).

The vehicle 100 may be a commercial vehicle, light, medium, or heavy duty vehicle, a passenger vehicle, an off-highway vehicle, and/or utility vehicle. Additionally or alternatively, the vehicle 100 and/or one or more of its components may be used in industrial, locomotive, military, agricultural, and aerospace applications. In one example, the vehicle 100 is an electric vehicle. In other examples, the vehicle 100 may be a hybrid vehicle, and/or the vehicle 100 may be powered by a combustion engine.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged proximate to a front end 160 of the vehicle 100 and thereby comprises a front axle, and the second axle assembly 112 is arranged proximate to a rear end 162 of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Furthermore, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

The vehicle 100 may further include a control system 14. The control system 14 is shown receiving information from a plurality of sensors 16 and sending control signals to a plurality of actuators 18. As one example, sensors 16 may include at least one clutch sensor 132 for monitoring a position of the clutch 130. Other sensors such as pressure, temperature, air/fuel ratio, and composition sensors when the prime mover 106 includes the engine, may be coupled to various locations in the vehicle 100. The plurality of actuators may include valves controlling flow of hydraulic fluid through the clutch 130. The control system 14 may include a controller 12 which may receive input data from the various sensors, process the input data, and trigger the plurality of actuators 18 in response to the processed input data, based on instruction or code programmed therein, corresponding to one or more routines. In particular, the controller 12 may be a microcomputer, including microprocessor units, input/output ports, an electronic storage medium for executable programs and calibration values such as a read only memory chip, random access memory, keep alive memory, and a data bus.

As described above, a transmission of a vehicle may include at least one clutch facilitating drive gear shifts at the transmission, and one or more of the clutches of the transmission may be FADCs. FADCs may also be used in other applications, including power take-off connections as a non-limiting example. A cross section of an exemplary embodiment of an FADC 200 is shown in FIG. 2. Specifically, a cross section of FADC 200 in a disengaged position 290 is shown. Reference axes 260 are also shown, and may be used for comparison to orientations of parts shown in FIGS. 3A-7. An FADC such as FADC 200 may be used to synchronize rotation of two components (e.g., two gears, two shafts, or one gear and one shaft) and transfer torque between the two components. The FADC 200 may be a wet clutch with fluid such as oil entering an interior 228 of the FADC 200 via pathways indicated by arrows 224 to lubricate the system. Additional fluid, such as oil, may enter a space 229 between a piston 212 and a clutch drum 206 to pressurize the piston 212 in order to engage and disengage the FADC 200. For example, a controller may adjust pressure applied to the piston via actuators such as valves (e.g., actuators 18 of FIG. 1) in response to a pressure sensor (e.g., sensors 16 of FIG. 1) fluidly coupled to the interior 228 and/or the space 229, and/or a clutch sensor (e.g., clutch sensor 132) which detects the position of the FADC 200. FADC 200 may include a friction synchronizing system and a mechanical locking system in order to synchronize rotation and transfer torque between components.

Specifically, a clutch gear 208 and a shaft 222 may be coupled to other components (e.g., gears, shafts) of a transmission or other system where control over synchronization of inertias of the components is desired on occasion. A bearing 217 may support the clutch gear 208 such that the clutch gear 208 may be indirectly coupled to the shaft 222. Further, the bearing 217 may be positioned in between the clutch gear 208 and shaft 222 such that the clutch gear 208 circumferentially surrounds bearing 217, and bearing 217 circumferentially surrounds the shaft 222. Thus, the clutch gear 208 and the shaft 222 may rotate independently of one another with low (e.g., negligible) friction between the clutch gear 208 and shaft 222 impeding rotational motion of either part while in disengaged position 290.

FADC 200 may also include the piston 212, the clutch drum 206, an endplate 402, and a friction discs 302. The friction disc 302 may additionally or alternatively be referred to as a disk. The endplate 402 and piston 212 may both mechanically couple to the clutch drum 206 via splined connection or other appropriate fitting, and the clutch drum 206 may be mechanically coupled to or formed integrally to the shaft 222. As such, the endplate 402, piston 212, and clutch drum 206 may rotate with the shaft 222 (e.g., with substantially equal angular speeds) about an axis of rotation 240. The friction disc 302 may be mechanically coupled to the clutch gear 208 (e.g., through splined connection) such that the friction disc 302 rotates with the clutch gear 208 (e.g., with substantially equal angular speeds) with axis of rotation 240.

The FADC 200 may further include several retaining rings (e.g., retaining rings 216, 218, 220) for securement of various components. For example, retaining ring 216 may hold an end of the piston return spring 214 in a desired placement, for example, along the x-axis. In another example, retaining rings 218 may fix bearing 217 in place. Additionally, retaining ring 220 may be used to hold endplate 402 in proper alignment and prevent axial movement of the endplate 402. Other retaining rings may be included in additional placements in other embodiments to prevent axial movement of components. Additionally or alternatively, other fasteners that are not shown in FIG. 2 may be included to secure components.

Additionally, the FADC 200 may include a first sealing ring 226 positioned around an outer diameter of the piston 212 and a second sealing ring 227 positioned around an inner diameter of the piston 212. For example, the first sealing ring 226 and the second sealing ring 227 may each be an O-ring. The first sealing ring 226 and the second sealing ring 227 may prevent leakage of fluid between the piston 226 and the clutch drum 206. For example, lubricant fluid in the interior 228 may not move past the first sealing ring 226 or second sealing ring 227 in the positive x-direction towards the space 229, and pressurizing fluid in the space 229 may not flow past the first sealing ring 226 or the second sealing ring 227 in the negative x-direction.

The piston 212 may be mechanically coupled to a first end of a piston return spring 214, and the shaft 222 may be coupled to a second end of the piston return spring 214, with the first end located in a positive x-direction relative to the second end. In some embodiments, there may be a single piston return spring 214 that may circumferentially surround a portion of the shaft 222. In other embodiments, there may be two or more piston return springs 214 arranged radially around the shaft 222. In other words, there may be one or more piston return springs 214. When the piston return spring(s) 214 are compressed relative to the position shown in FIG. 2, the piston 212 may move in an axial direction indicated by arrow 230 until a surface 248 of the piston may contact (and in some cases press against) friction elements 360 of the friction disc 302. Friction elements 360 may be on one or more surfaces of the friction disc 302 to generate friction between the friction elements 360 and the piston 212 upon contact. Additionally, the friction disc 302 may move axially (e.g., laterally and parallel with the x-axis) in response to contact with the piston 212 such that the friction elements 360 may also contact a surface 282 of the endplate 402, generating friction between the endplate 402 and the friction disc 302. The friction between the piston 212 and the friction elements 360 of the friction disc 302 (and in some cases friction between the friction elements 360 and the endplate 402) may cause synchronization of rotation of the piston 212 and friction disc 302, thus synchronizing rotation of the shaft 222 and clutch gear 208.

In some embodiments, more than one friction disc such as friction disc 302 may be included in an FADC. In such an embodiment, the friction discs may be axially aligned with one another, and may share an axis of rotation (e.g., axis of rotation 240). Other discs may also be layered in between the friction discs.

The piston 212 may include a circular bore with a diameter sized to fit a portion 210 of the clutch gear 208, piston return spring(s) 214, and shaft 222 extending axially therethrough. The piston may further include modified cylindrical openings 232 with three discrete diameters resulting in the cross section as shown for positioning of pins 202 within the openings 232. In the cross section view of FIG. 2, one opening and one pin are shown, however, a plurality of pins 202 and openings 232 may be radially arranged in the z-y plane such that a plurality of pins 202 may be equally spaced from the axis of rotation 240. For example, there may be eight pins. An example configuration of pins 202 will be shown and further described below with reference to FIGS. 3B and 4B. As shown in FIG. 2, the pins 202 may have a cylindrical body 238 having diameter 244 with a cylindrical base 234 having larger diameter 246. The base 234 of a pin 202 may be mechanically coupled to a first end of a pin return spring 204, and an opposing surface 252 (e.g., parallel with the y-axis) of piston 212 may be mechanically coupled to a second end of the pin return spring 204.

In some examples, each pin 202 may be mechanically coupled to a single pin return spring 204 which circumferentially surrounds the cylindrical body 238. In other examples, a plurality of pin return springs 204 may be arranged around each pin 202. In other words, there may be one or more pin return springs 204 per pin 202. A single pin return spring per pin may simplify the design while a plurality of pin return springs per pin may provide more stability, for example.

When pin return springs 204 are compressed relative to the position shown in FIG. 2, pins 202 may move axially relative to the piston 212 in the direction indicated by arrow 230 until a surface of the base 234 contacts an opposing surface 236 across the y-axis of the opening 232 and/or an end of the pin 202 extends through a slot 304 of the friction disc 302 and at least a portion of a recess 404 of the endplate 402. The friction disc 302 and endplate 402 are further described below via FIGS. 3A-3B and 4A-4B, respectively.

Turning to FIGS. 3A and 3B, a first view 300 and a second view 310, respectively, of friction disc 302 are shown, with reference axes 260 for relation to the FADC 200 of FIG. 2. As described above, one or more friction discs such as friction disc 302 may be included in an FADC, such as FADC 200 of FIG. 2. FIGS. 3A-3B and their respective components and features may be referred to collectively herein. Friction disc 302 may be an exemplary embodiment of such a friction disc, however other embodiments may be included in an FADC without departing from the scope of this disclosure. Friction discs such as friction disc 302 may also include additional features not shown in FIGS. 3A and 3B, such as ridges, teeth, and the like for splined connections as discussed above. Additionally, friction discs may further include friction elements (e.g., friction elements 360 of FIG. 2) on one or more surfaces of the friction discs, which are not depicted in FIGS. 3A and 3B for clarity.

The first view 300 shows friction disc 302 with a plurality of slots 304. The friction disc 302 may be annulus shaped, with an outer edge 306 having outer diameter 318 and inner edge 320 having inner diameter 322, centered around axis of rotation 240 which is parallel to the x-axis. The outer diameter 318 may be sized to fit within an FADC as shown in FIG. 2. More specifically, the outer diameter 318 may be determined according to an inner diameter of a clutch drum (e.g., clutch drum 206 of FIG. 2) of the FADC to allow for adequate fastening (e.g., via splined connection). The inner diameter 422 may be sized to accommodate a portion of a gear clutch (e.g., portion 210 of FIG. 2), one or more piston return springs (e.g., piston return springs 214 of FIG. 2), and a shaft (e.g., shaft 222 of FIG. 2) extending axially therethrough.

The slots 304 of friction disc 302 may each be shaped as an elongated ellipse (e.g., a stadium, an obround, a pill shape), and curved such that a radial distance 308 between a slot 304 and outer edge 306 of the friction disc 302 may be constant across the slots 304. For example, the slot 304 may have a kidney or bean shape. As such, a radial distance 326 between the slots 304 and inner edge 320 may also be constant. In some examples, distance 308 may be greater than distance 326 such that the slots 304 are arranged closer to the inner edge 320 than outer edge 306. In other examples, distance 308 may be less than distance 326 such that the slots 304 may be arranged closer to the outer edge 306 than the inner edge 320. In yet other examples, distance 308 may be substantially the same as distance 326 such that the slots are spaced equally away from inner and outer edges, 320 and 306, respectively. Additionally, in some examples, the slots 304 may be equidistant from each other, angularly as shown by arrow 312 and/or radially as shown by arrow 314.

The radially arranged slots 304 may be adapted as described above to receive a number of pins (e.g., pin 202 of FIG. 2) as shown in FIG. 3B. Specifically, FIG. 3B shows the second view 310 of friction disc 302 which includes cross sections of pins 202. Some dimensions of friction disc 302 shown in FIG. 3A are not shown in FIG. 3B for clarity (e.g. distance 308, outer diameter 318, distances shown by arrow 312 and arrow 314). In one example, each of the slots 304 may be configured to receive two pins, as shown in FIG. 3B. The slots 304 may be configured such that the pins 202 may each contact an end of a slot as the pins 202 extend axially through the slots 304. For example, a first pin 202a may contact a first end 342 of a slot 304, and a second pin 202b may contact a second end 340 of a slot 304. In this way, first pin 202a and second pin 202b may each prevent opposite rotational movement of the friction disc 302 relative to the pins 202. More specifically, first pin 202a may counteract clockwise torque while second pin 202b may counteract counterclockwise torque, as oriented in FIG. 3B.

A number of slots of a friction disc (e.g., slots 304 of friction disc 302) may depend on a number of pins (e.g., pin 202 of FIG. 2) included in an FADC. For example, an FADC may include eight pins, and a friction disc included in the FADC may have four slots, arranged as shown in FIGS. 3A and 3B. In another example, an FADC that includes more pins may have more slots in friction discs. In some examples, each slot may be configured to receive three or more pins. As such, slots in other embodiments may be sized and shaped accordingly. Further, in other embodiments, slots may be arranged differently on a friction disc to accommodate placement of pins in an FADC. For example, slots may have a different shape, size and/or location depending on a number of pins and their placement relative to the friction disc in an FADC. Moreover, in some examples, friction discs may not be a circular annulus shape, and may rather be rectangular, square, elliptical, or other shape according to geometry of an FADC in which the friction disc is incorporated.

FIGS. 4A and 4B show a first view 400 and a second view 410, respectively, of an endplate 402, which is included in FADC 200 as described with reference to FIG. 2. The endplate 402 may be shaped as an annulus with outer edge 406 having outer diameter 418 and inner edge 420 having inner diameter 422. The inner diameter 422 may be sized to accommodate a portion of a gear clutch (e.g., portion 210 of FIG. 2), one or more piston return springs (e.g., piston return springs 214 of FIG. 2), and a shaft (e.g., shaft 222 of FIG. 2) extending axially through the endplate 402. The outer diameter 418 may be sized to fit within and be connected to (e.g., via a splined connection) a clutch drum (e.g., clutch drum 206 of FIG. 2). In some examples, the inner diameter 422 may be substantially the same as an inner diameter of friction disc(s), such as inner diameter 322 of friction disc 302 FIG. 3A in an FADC. In other examples, inner diameter 422 may be greater than or less than the inner diameter of friction disc(s), such as the inner diameter 322 of friction disc 302. Likewise, in some examples, the outer diameter 418 of the endplate 402 may be substantially the same as an outer diameter of friction disc(s), such as outer diameter 318 of friction disc 302 FIG. 3A. In other examples, the outer diameter 418 may be greater than or less than the outer diameter of the friction disc(s), such as outer diameter 318 of friction disc 302. Additionally, axis of rotation 240 may extend axially through a midpoint of a diameter of the endplate 402 (e.g., outer diameter 418 and inner diameter 422). Further, the endplate 402 and friction disc(s) may share the axis of rotation.

The endplate 402 may further comprise a plurality of recesses 404. A number of recesses may be the same as a number of pins (e.g., first pin 202a and second pin 202b in FIG. 3B). For example, an FADC with eight pins may have eight recesses, as shown in FIG. 4A. The recesses 404 may each be spaced from the outer edge by a distance 408 and from the inner edge by a distance 426. In some examples, distance 408 is substantially the same as distance 426. In other examples, distance 408 may be greater than or less than distance 426. In some examples, distance 408 and distance 426 may vary such that recesses are spaced differently from the outer edge 406 and inner edge 420 than each other. The recesses 404 may also be spaced radially from one another as shown in FIG. 3B such that there may be a first space 412 between pairs, and a second space 424 between two recesses within a pair. The first space 412 may be the same as the space (e.g., distance shown by arrow 312) between slots 304 of friction disc 302 as shown in FIGS. 3A and 3B to allow for proper alignment of pins 202 with both recesses 404 and slots 304.

The recesses 404 may be sized and shaped according to a cross section of the pins. FIG. 3B shows cross sections of pins 202 going at least partially through the recesses 404. In some examples, the pins may have a circular cross section, and accordingly, the recesses 404 may be cylindrical. In such an example, the recesses 404 may have a diameter at least as large as a diameter of the pin cross section. In some embodiments wherein pins have varying shape from one another, the recesses 404 may also have varying shapes. For example, the shape of the cross section of the recesses 404 may be elliptical, rectangular, triangular, octagonal, square, and the like, or a combination thereof, depending on a geometry of corresponding pins. Additionally, the recesses 404 may be arranged according to arrangement of the pins 202. For example, in some embodiments, first space 412 and second space 424 may be substantially the same. In other words, the recesses 404 may be radially equidistant from each other in examples where pins 202 are radially equidistant from each other.

FIGS. 3A-4B are drawing approximately to the same scale, although other relative dimensions may be used, if desired.

Returning to FIG. 2, the recesses 404 may extend partially through a thickness (e.g., dimension parallel to the x-axis) of the endplate 402 with a depth 284 less than the thickness. In other examples, the recesses 404 may be through holes and extend through the entire thickness of the endplate 402 such that the depth 284 is the same as the thickness. The recesses 404 may be defined by openings 280 in the surface 282 of the endplate 402. Additionally, when the depth 284 is less than the thickness of the endplate 402, the openings may be defined by end surfaces 283. For example, when the recesses are cylindrical, the openings 280 and the end surfaces 283 may be circular in the y-z plane. The pins 202 may be moved, for example by pressure compressing the piston return spring 214 and the pin return springs 204, through the slots 304 of the friction disc 302 and at least partially into the recesses 404 such that the pins are mechanically locked with the endplate 402. When the pins 202 are locked with the endplate 402, the pins 202 may extend at least partially though the openings 280. In some examples, when the pins 202 are locked with the endplate 402, an end of the cylindrical body 238 may be in face sharing contact with the end surfaces 283. In this way, a dog clutch mechanism may be engaged in order to transfer higher torque than may be achieved with a same number of friction discs alone. Additionally, the dog clutch mechanism may allow the FADC to operate with greater efficiency than may be achieved through friction discs alone. To elaborate, a greater number of friction discs may be used in a clutch without a dog clutch mechanism to transfer the approximately same maximum torque as a clutch with both friction discs and a dog clutch mechanism. Thus, for example, drag losses may be greater in a friction clutch which does not have a dog clutch mechanism than an FADC with similar torque transfer ability due to the greater number of friction discs. Consequently, the FADC may operate with less drag losses and therefore greater efficiency than the friction clutch.

There may be a number of positions of an FADC such as FADC 200 according to the movement of a piston (e.g., piston 212 of FIG. 2) and pins (e.g., pins 202 of FIG. 2). FIG. 5 shows a table 500 of the positions of an FADC, including a row 512 showing a disengaged position, a row 514 showing a synchronizing position, and a row 516 showing an engaged position. Table 500 includes a column 502 which shows pressure for each position, a column 504 which shows compression of a piston return springs (e.g., piston return springs 214 of FIG. 2) for each position, and a column 506 which shows compression of pin return springs (e.g., pin return springs 204 of FIG. 2) for each position. The pressure may be hydraulic pressure, for example applied though oil. There may be a first threshold pressure and a second threshold pressure, wherein the second threshold pressure is greater than the first threshold pressure. The first threshold pressure may correspond to a spring load of the piston return springs such that the piston return springs may be compressed to allow the piston to come into contact with the friction disc as pressure increases beyond the first threshold pressure. The second threshold pressure may correspond to a spring load of the pin return springs, such that the pin return springs may be compressed to allow pins to extend through the friction disc and endplate as pressure increases beyond the second threshold pressure. As used herein, "extended" may be used relative to "compressed" to describe springs that may be relatively less compressed, however "extended" does not indicate whether the springs are expanded, at equilibrium, or compressed, relative to the equilibrium of the springs. In other words, a spring in an extended position may be under compressive tension, but relatively less so than the spring in a compressed position. Additionally, because the pressure may be a continuous measure, and springs such as the piston return springs and pin return springs may accordingly be compressed continuously rather than discretely, the positions described (e.g., disengaged, engaged, synchronizing) may be ranges encompassing relative positions rather than combinations of exact positions of each element. For example, a synchronizing position may occur with a range of spring (e.g., piston return springs and pin return springs) compressions according to a range of pressures, with lower bound being the first threshold pressure and upper bound being the second threshold pressure.

In the disengaged position of row 512, the pressure may be less than the first threshold pressure. As such, the piston return springs and pin return springs may be extended. As shown in disengaged position 290 of FADC 200 in FIG. 2, the piston 212 may be spaced away from the friction elements 360 of the friction disc 302, and the base 234 of the pin 202 may be spaced away from the piston 212. Because the bearing 217 allows for independent rotation of the shaft 222 and the clutch gear 208, and none of the elements physically rotationally coupled to the shaft 222 (e.g., piston 212 and endplate 402 via clutch drum 206) are in contact with the elements physically rotationally coupled to the clutch gear 208 (e.g., friction disc 302), the shaft 222 and clutch gear 208 may rotate independently of one another. For example, the shaft 222 and clutch gear 208 may have different angular speeds of rotation about axis of rotation 240.

Returning to FIG. 5, in the synchronizing position of row 514, the pressure exceeds the first threshold pressure, thus the piston return springs may be compressed. However, the pressure is less than the second threshold pressure, therefore the pin return springs may remain substantially extended. An FADC in the synchronizing position may be said to be partially engaged.

Turning briefly to FIG. 6, it shows a synchronizing position 600 of the FADC 200, where the piston 212 may be in face sharing contact with at least a portion of the friction elements 360 of the friction disc 302. In some examples, the surface 282 of the endplate 402 may also be in face-sharing contact with the friction elements 360 in the synchronizing position. Further, the piston return spring 214 may pull the piston 212 to press against the friction disc 302. Thus, friction generated between the piston 212 and friction disc 302 having dissimilar angular speeds may synchronize the rotation of friction disc 302 and piston 212 to more similar angular speeds or substantially the same angular speed, thereby synchronizing the shaft 222 and clutch gear 208. Similar to the disengaged position, the base 234 of the pin 202 may be spaced away from the piston 212 and the pin 202 may be to the right of the friction disc 302 and endplate 402 such that the pin 202 is not engaged with (e.g., extending through, being received by) the slots 304 or recesses 404 of the friction disc 302 and endplate 402, respectively.

Returning to FIG. 5, in the engaged position of row 516, the pressure is above the first and second threshold pressures, therefore the piston return springs and pin return springs are compressed.

Turning briefly to FIG. 7, it shows an engaged position 700 of FADC 200, where the piston 212 may be in face sharing contact with the friction elements 360 of the friction disc 302, similar to the synchronizing position 600 of FIG. 6 described above. In some examples, the surface 282 of the endplate 402 may also be in face sharing contact with the friction elements 360 in the engaged position. Additionally, in an engaged position, such as engaged position 700, an end (e.g., in the negative x direction) of the cylindrical body 238 of the pin 202 may be to the left of the friction disc 302 such that the pin 202 extends axially through the slot 304 of the friction disc 302. In some examples, when pressure is further increased, the pin 202 may further extend into the recess 404 of the endplate 402. As such, an engaged position may include pin positions including and between extending through the friction disc and further extending into recesses of the endplate.

Figure 8:
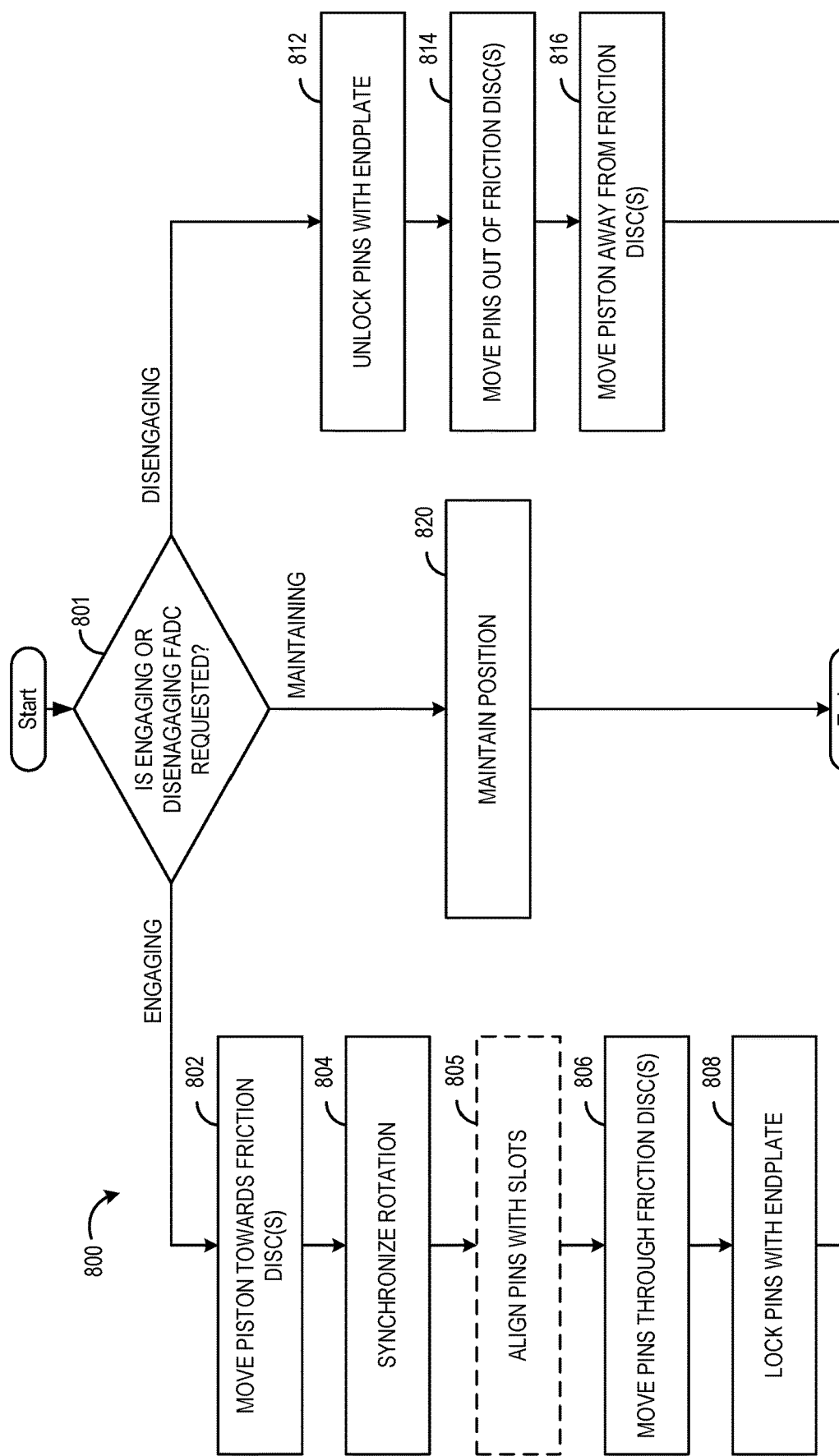
FIG. 8 shows a flowchart of a method for engaging, disengaging, or maintaining a position of an FADC, such as the FADC depicted in FIG. 2.

FIG. 8 shows a flowchart of a method 800 for engaging, disengaging, or maintaining a position of an FADC, such as FADC 200 of FIGS. 2 and 6-7. Method 800 may be initiated by a controller communicatively coupled to the FADC (e.g., controller 12 of vehicle 100 in FIG. 1) and carried out by an actuator (e.g., actuators 18 of FIG. 1), according to instructions in stored memory (e.g., non-volatile memory) of the controller and signals received from vehicle sensors (e.g., sensors 16 of FIG. 1). For example, vehicle sensors detecting a change in driving conditions or user input may prompt the controller to send a signal to a pressure regulation system, which may adjust (e.g., increase, decrease) pressure as demanded to achieve a desired position (e.g., engaged, disengaged, or synchronizing position) of the FADC. Specifically, positions of pins and a piston (e.g., pins 202 and piston 212 of FADC 200 in FIGS. 2, 6, and 7) relative to friction disc(s) and an endplate of an FADC (e.g., friction disc 302 and endplate 402 of FADC 200 in FIGS. 2, 6 and 7) may be determined respectively by pin return springs and piston return springs (e.g., pin return spring 204 and piston return spring 214). The piston return springs and pin return springs may be compressed and/or expanded by hydraulic pressure according to a first threshold pressure and a second threshold pressure as described with reference to FIG. 5 above. In other words, movement of the piston and pins may be actuated by hydraulic pressure. As such, pressure may be increased or decreased by changing fluid (e.g., oil) flow. In some examples, the method 800 may be repeated automatically on a regular interval, with the controller programming including a timed initiation of the method 800. Additionally or alternatively, the method 800 may be triggered by a change in vehicle sensor signals.

Method 800 may begin at 801, where it is determined whether engaging, disengaging, or maintaining the FADC is requested. The controller may assess a current position of the FADC in comparison to the desired position of the FADC in order to determine whether engaging, disengaging, or maintaining is demanded. For example, if the current position is disengaged and the desired position is engaged, engaging may be demanded. In another example, if the current position is engaged and the desired position is disengaged, disengaging may be demanded. In some examples, if the current position is the same as the desired position, neither engaging or disengaging may be demanded. Thus, maintaining may be demanded. In at least some examples, the controller may then request the demanded position by sending signals to the actuator.

If engaging is requested (ENGAGING at 801), method 800 proceeds to 802 which includes moving the piston towards one or more friction discs. For example, as shown in FIG. 2, the piston 212 may be moved in the direction shown by arrow 230. The movement of the piston may be initiated by increasing pressure to overcome a spring load of piston return spring(s), thus compressing the piston return spring(s), as discussed with regards to FIG. 5. The pressure may not be above the first threshold pressure until the piston is in face-sharing contact with one of the friction disc(s).

Method 800 proceeds to 804 wherein rotation is synchronized. More specifically, synchronizing rotation of a clutch gear and a shaft (e.g., clutch gear 208 and shaft 222 of FIG. 2) may occur due to the piston pressing against the friction disc(s). Applying a first pressure, wherein the first pressure is between the first threshold pressure and the second threshold pressure, may compress piston return springs, thereby pressing the piston against the friction disc(s). The friction generated in the synchronizing position may provide resistance to unequal rotational speeds of the piston and friction disc(s) to allow for synchronization thereof.

Method 800 proceeds to 805, wherein the pins are optionally aligned with slots of the friction disc(s), such as slots 304 shown in FIGS. 2-3B, 6 and 7. In some cases, after synchronization at 804, the pins may be positioned in alignment with slots in the friction disc(s). For example, the pins may be aligned with the slots in a similar manner to as shown in FIG. 3B. Thus, 805 may not be completed. If the pins and slots are not aligned, the pins may push on the friction disc(s) with increasing pressure until a torque load causes a slippage of the friction disc(s), thereby allowing slots to align with sets of pins and consequently allowing pins to move towards the endplate and extend through the friction disc(s) in a subsequent step (806). Thus, an FADC in the synchronizing position may transfer up to a first torque between the clutch gear and the shaft, wherein the first torque is the torque load which causes the slippage of the friction disc(s). Having slots in the friction disc(s) with the shape as described with reference to FIGS. 3A-3B, as compared to being shaped similarly to recesses of the endplate as described in regards to FIGS. 4A-4B, may increase the time the pins may take to align with the slots during slippage, thus preventing misalignment following slippage.

Next, method 800 proceeds to 806 in which pins (e.g., pins 202 of FIG. 2) are moved through the friction disc(s). For example, moving the pins through the friction disc(s) may include compression of the pin return springs due to a further increase in pressure (e.g., applying a second pressure which is greater than the second threshold pressure). The pins may move in the same direction as the piston moves at 802. Because the pins may be aligned with the slots (due to being aligned following synchronization at 804 or completing 805), the pins may extend through the slots, thus moving through the friction disc(s).

Method 800 then proceeds to 808 wherein pins are locked with the endplate. To elaborate, locking the pins with the endplate may include the pin return springs being further compressed by further increasing pressure beyond the second pressure, such that the pins continue to move towards the endplate (e.g., in the direction shown by arrow 230 of FIG. 2), and as a result, the pins are positioned at least partially in the recesses of the endplate (e.g., recesses 404 of endplate 402 as shown in FIGS. 2 and 4A-4B). The pins being at least partially in the recesses of the endplate mechanically locks the rotation of the pins, piston, endplate, and friction disc. Thus, method 800 ends in an engaged position in which rotation of the clutch gear and shaft are synchronized and up to a second torque may be transferred therebetween. The second torque may be greater than the first torque, therefore the locking of pins with the endplate may allow for increased torque transfer than can be achieved by interaction of the piston and the pins with the friction disc(s).

If disengaging is requested (DISENGAGING at 801), the method 800 proceeds to 812, wherein the pins are unlocked with the endplate. For example, unlocking the pins with the endplate may include the pins being moved back (e.g., in a positive x-direction according to reference axes 260 in FIGS. 2, 6, and 7, opposite the direction indicated by arrow 230) by expansion of the pin return springs in response to a reduction in pressure. Following 812, the pins may still extend through slots of the friction disc(s), but not into recesses of the endplate. As such, the pressure may be above both the first and second threshold pressures.

The method 800 continues to 814, wherein pins are moved out of the friction disc(s). For example, moving the pins out of the friction disc(s) may be achieved by further reducing the pressure (e.g., applying the second pressure which is below the second threshold pressure) such that the pin return springs further expand and move the springs in the same direction as in 812 described above, at least until the pins no longer extend through the slots of the friction disc(s). Thus, the FADC may be in a synchronizing position after 814 with pressure between the first threshold pressure and the second threshold pressure.

The method 800 proceeds to 816, wherein the piston is moved away from the friction disc(s). Moving the piston away from the friction disc(s) may include further reducing the pressure to a pressure below the first threshold pressure, allowing for expansion of the piston return springs in response. The FADC may be in a disengaged position after 816, thus method 800 ends.

If maintaining is requested (MAINTAINING at 801), the method 800 proceeds to 820 wherein the FADC position is maintained. Therefore, a change of position (e.g., engaging or disengaging) is not demanded. Maintaining the position may include maintaining the pressure. As such, the piston and pins may remain in the same positions as before the start of method 800. Method 800 ends following 820.

The method 800 is a non-limiting example of a method that may be implemented in order to engage, disengage, or maintain a position of an FADC. Variations of method 800 may also be performed, including method 800 with additional steps before 801 and/or after a last step before ending (e.g., 808, 816, 820). In some embodiments, method 800 may exclude certain steps. For example, if a clutch sensor detects that the current position of an FADC is synchronizing and the desired position is engaged, the method may choose engaging (ENGAGING at 801) and skip steps 802 and 804) to further engage the FADC and result in an engaged position. In some examples, if a demanded torque load is relatively low and the friction disc(s) may be adequate for transferring the demanded torque load, the method 800 may end in a synchronizing position (e.g., end after 804 or 806, skip 808). In this way, method 800 and/or variations thereof may be used to transition between and/or within any of the positions (e.g., engaging, disengaging, synchronizing) of an FADC and/or maintain the current position.

The technical effect of the FADC disclosed herein is to combine friction clutch and dog clutch mechanisms into a single clutch with increased efficiency compared to friction clutches with similar torque transfer ability, and greater torque transfer ability compared to friction clutches with the same number of friction discs.

The disclosure also provides support for a clutch assembly, comprising: a piston, one or more pins, wherein the one or more pins are adapted to be moved by the piston, one or more friction discs, wherein the one or more friction discs have a number of slots and the one or more pins pass through the slots, and an endplate, wherein the endplate has a number of recesses adapted to receive the one or more pins. In a first example of the system, the number of slots is less than a number of pins. In a second example of the system, optionally including the first example, the number of recesses is equivalent to a number of pins. In a third example of the system, optionally including one or both of the first and second examples, the piston is adapted to be actuated by hydraulic pressure. In a fourth example of the system, optionally including one or more or each of the first through third examples, the one or more friction discs are mechanically coupled to a clutch gear and the endplate is mechanically coupled to a shaft via a clutch drum. In a fifth example of the system, optionally including one or more or each of the first through fourth examples, the system further comprises: one or more piston return springs, wherein the one or more piston return springs are adapted to move the piston towards the endplate when the one or more piston return springs are extended. In a sixth example of the system, optionally including one or more or each of the first through fifth examples, the system further comprises: one or more pin return springs, wherein the one or more pin return springs are adapted to move the one or more pins towards the endplate when the one or more pin return springs are extended. In a seventh example of the system, optionally including one or more or each of the first through sixth examples, contact between the piston and friction discs synchronizes rotation of a clutch gear and a shaft. In a eighth example of the system, optionally including one or more or each of the first through seventh examples, the one or more pins extending through the slots and at least partially through openings of the recesses mechanically locks rotation of a clutch gear and a shaft, such that torque is transferred between the clutch gear and shaft.

The disclosure also provides support for a method, comprising: in response to a request to engage a friction assisted dog clutch, moving a piston of the friction assisted dog clutch towards a friction disc of the friction assisted dog clutch, synchronizing rotation of a clutch gear and a shaft of the friction assisted dog clutch, moving a pin of the friction assisted dog clutch through a slot of the friction disc with the pin unlocked from an endplate of the friction assisted dog clutch, and locking the pin with the endplate of the friction assisted dog clutch. In a first example of the method, the method further comprises: in response to a request to disengage the friction assisted dog clutch, unlocking the pin with the endplate of the friction assisted dog clutch, moving the pin out of the slot of the friction disc, and moving the piston away from the friction disc. In a second example of the method, optionally including the first example, moving the piston and moving the pin comprises actuating movement of the pin and the piston by hydraulic pressure. In a third example of the method, optionally including one or both of the first and second examples, synchronizing rotation includes pressing the piston against the friction disc. In a fourth example of the method, optionally including one or more or each of the first through third examples, locking the pin with the endplate includes the pin extending at least partially through an opening of a recess of the endplate. In a fifth example of the method, optionally including one or more or each of the first through fourth examples, the request to engage the friction assisted dog clutch is initiated by a controller communicatively coupled to the friction assisted dog clutch in response to a signal from a sensor fluidly coupled to an interior of the friction assisted dog clutch.

The disclosure also provides support for a transmission, comprising: a friction assisted dog clutch, wherein the friction assisted dog clutch includes a piston coupled to a piston return spring and adapted to axially move a pin, the pin coupled to a pin return spring, one or more friction discs, each of the one or more friction discs including a slot, and an endplate including a recess adapted to receive the pin, a controller including instructions stored on non-volatile memory, the instructions executable to: in response to a request to engage the friction assisted dog clutch, apply a first pressure to the piston, the first pressure greater than a first threshold pressure and less than a second threshold pressure, the first pressure adapted to compress the piston return spring, and apply a second pressure to the piston, the second pressure greater than the second threshold pressure and adapted to compress the pin return spring. In a first example of the system, the instructions of the controller are further executable to: in response to a request to disengage the friction assisted dog clutch, apply the second pressure to the piston, and apply the first pressure to the piston. In a second example of the system, optionally including the first example, the friction assisted dog clutch is a wet clutch. In a third example of the system, optionally including one or both of the first and second examples, applying the first pressure synchronizes rotation of the piston and friction disc such that up to a first torque is transferred therebetween. In a fourth example of the system, optionally including one or more or each of the first through third examples, applying the second pressure locks the piston and friction disc such that up to a second torque, the second torque being higher than the first torque, is transferred therebetween.

FIGS. 1-4B and 6-7 show example configurations with relative positioning of the various components; though other relative dimensions may be used. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

Features described as axial may be approximately parallel with an axis referenced unless otherwise specified. As used herein, the terms "approximately" is construed to mean plus or minus five percent of the range unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to a longitudinal axis. Features described as lateral may be approximately parallel with the lateral axis. A vertical axis may be normal to a lateral axis and a longitudinal axis. Features described as vertical may be approximately parallel with a vertical axis.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A clutch assembly, comprising:
a piston;
one or more pins, wherein the one or more pins are adapted to be moved by a hydraulic pressure;
one or more friction discs, wherein the one or more friction discs have a number of slots and the one or more pins pass through the slots; and
an endplate, wherein the endplate has a number of recesses adapted to receive the one or more pins, wherein at least one of:
the number of slots is less than a number of pins;
the one or more friction discs are mechanically coupled to a clutch gear and the endplate is mechanically coupled to a shaft via a clutch drum;
the clutch assembly further comprises one or more piston return springs adapted to be compressed when the piston is moved towards the endplate; and
the clutch assembly further comprises one or more pin return springs adapted to be compressed when the one or more pins are moved towards the endplate.

2. The clutch assembly of claim 1, wherein the number of recesses is equivalent to a number of pins.

3. The clutch assembly of claim 1, wherein the piston is adapted to be actuated by the hydraulic pressure.

4. The clutch assembly of claim 1, wherein contact between the piston and the one or more friction discs synchronizes rotation of a clutch gear and a shaft.

5. The clutch assembly of claim 1, wherein the one or more pins extending through the slots and at least partially through openings of the recesses mechanically locks rotation of a clutch gear and a shaft, such that torque is transferred between the clutch gear and shaft.

6. A method, comprising:
in response to a request to engage a friction assisted dog clutch, moving a piston of the friction assisted dog clutch towards a friction disc of the friction assisted dog clutch;
synchronizing rotation of a clutch gear and a shaft of the friction assisted dog clutch;
moving a pin of the friction assisted dog clutch through a slot of the friction disc with the pin unlocked from an endplate of the friction assisted dog clutch; and
locking the pin with the endplate of the friction assisted dog clutch.

7. The method of claim 6, wherein the method further comprises:
in response to a request to disengage the friction assisted dog clutch, unlocking the pin with the endplate of the friction assisted dog clutch;
moving the pin out of the slot of the friction disc; and moving the piston away from the friction disc.

8. The method of claim 7, wherein each of moving the piston towards the friction disc, moving the pin through the slot of the friction disc, moving the pin out of the slot of the friction disc, and moving the position away from the friction disc comprises actuating movement of the pin and the piston by hydraulic pressure.

9. The method of claim 8, wherein synchronizing rotation includes pressing the piston against the friction disc.

10. The method of claim 9, wherein locking the pin with the endplate includes the pin extending at least partially through an opening of a recess of the endplate.

11. The method of claim 10, wherein the request to engage the friction assisted dog clutch is initiated by a controller communicatively coupled to the friction assisted dog clutch in response to a signal from a sensor fluidly coupled to an interior of the friction assisted dog clutch.

12. A transmission, comprising:
a friction assisted dog clutch, wherein the friction assisted dog clutch includes a piston coupled to a piston return spring, a pin coupled to a pin return spring, one or more friction discs, and an endplate including a recess adapted to receive the pin, each of the piston and the pin being adapted to be moved axially by a hydraulic pressure, and each of the one or more friction discs including a slot; and
a controller including instructions stored on non-volatile memory, the instructions executable to:
in response to a request to engage the friction assisted dog clutch,
apply a first pressure to the piston, the first pressure greater than a first threshold pressure and less than a second threshold pressure, the first pressure adapted to compress the piston return spring; and
apply a second pressure to the piston, the second pressure greater than the second threshold pressure and adapted to compress the pin return spring.

13. The transmission of claim 12, wherein the instructions of the controller are further executable to:
in response to a request to disengage the friction assisted dog clutch,
apply a third pressure to the piston, the third pressure greater than the first threshold pressure and less than the second threshold pressure, the third pressure adapted to extend the pin return spring; and
apply a fourth pressure to the piston, the fourth pressure less than the first threshold pressure, the fourth pressure adapted to extend the piston return spring.

14. The transmission of claim 12, wherein the friction assisted dog clutch is a wet clutch.

15. The transmission of claim 12, wherein applying the first pressure synchronizes rotation of the piston and friction disc such that up to a first torque is transferred therebetween.

16. The transmission of claim 15, wherein applying the second pressure locks the piston and friction disc such that up to a second torque, the second torque being higher than the first torque, is transferred therebetween.

* * * * *